INVENTORS
GERALD MARTIN
LAURIE WALKER
BY
William E. Recktenwald ic material by extruding a mixture of the material with binder and during extrusion subjecting the plastic mixture to an artificial orientating magnetic field to impart anisotropic magnetic properties, subjecting the extruded material to a demagnetizing field to prevent material dimensional changes in the extrudate, and thereafter firing the extruded mass to sinter the non-metallic material and remove the plastic binder.

3,387,066
METHOD FOR PRODUCING SINTERED NON-METALLIC MAGNETIC MATERIALS

Gerald Martin, Towcester, and Laurie Walker, Blisworth, England, assignors to Plessey-UK Limited, Essex, England
Filed Aug. 10, 1964, Ser. No. 388,543
4 Claims. (Cl. 264—24)

ABSTRACT OF THE DISCLOSURE

A method for producing bodies of sintered non-metallic magnetic material by extruding a mixture of the material with binder and during extrusion subjecting the plastic mixture to an artificial orientating magnetic field to impart anisotropic magnetic properties, subjecting the extruded material to a demagnetizing field to prevent material dimensional changes in the extrudate, and thereafter firing the extruded mass to sinter the non-metallic material and remove the plastic binder.

The disclosure

Figures 1, 2:
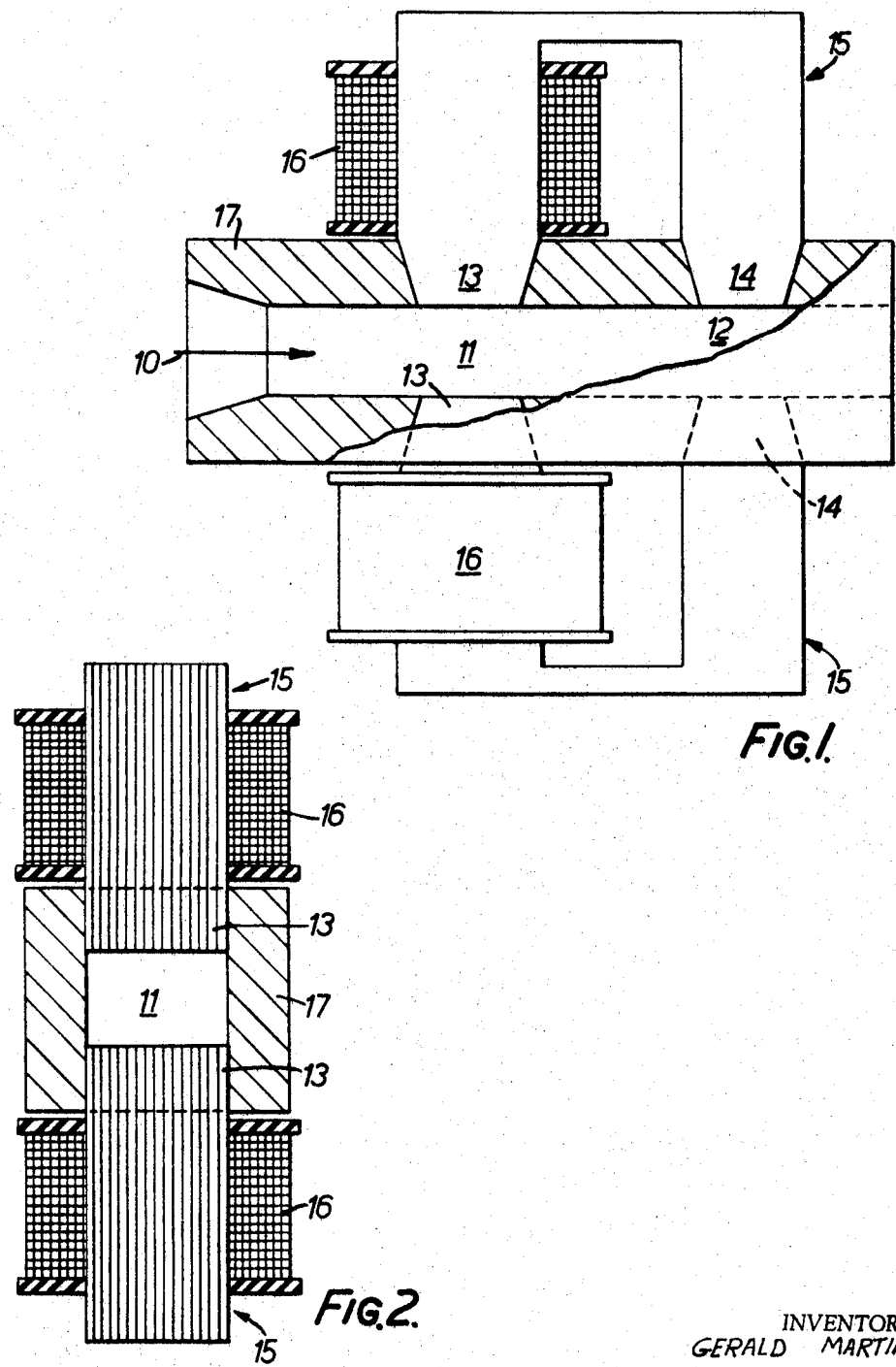

This invention relates to methods of producing bodies of sintered non-metallic magnetic material, having particular but not exclusive reference to the manufacture of bodies of sintered barium ferrite of the general formula $BaO.XFe_2O_3$, where X is between 3 and 8. Barium ferrite materials have properties that make them very suitable for use as permanent magnets, and for many applications the possibility of imparting their magnetic properties with a marked degree of anisotropy is distinctly advantageous.

According to the invention we provide a method of producing magnetic bodies of sintered non-metallic material, whereby the material in granular form is rendered plastic by mixture with a relatively small proportion of a binder and is extruded with a desired cross-section, the extruded material being subsequently fired to remove substantially all the binder and to sinter together the particles of the magnetic material to form a rigid body, the plastic material being subjected during extrusion to an artificial magnetic field and being imparted thereby with anisotropic magnetic properties that are retained by the sintered material.

According to a feature of the invention the extruded material is subjected to a demagnetizing field before sintering. Preferably to achieve this the plastic material is extruded through a nozzle having means for applying a magnetic field to the material at two spaced regions during its passage through the nozzle, the orientating field at the first said region and the demagnetizing field at the second said region being oppositely directed. The orientating and demagnetizing fields are preferably provided by different portions of a common magnetic circuit.

The extruded material preferably consists of pre-fired particles having a size between 0 and 10 microns, the material being rendered plastic by mixture with a suitable binder.

The extrusion nozzle may incorporate either permanent magnets or energising coils to produce the required magnetic field for producing any desired alignment of the ferrite particles. The value of the field preferably exceeds 3,000 oersteds. The field to which the material is subjected during extrusion may be transverse, longitudinal, or radial in relation to the extruded section. The field may be continuous or pulsed.

The foregoing and other features of the invention will be evident from the following description of the manufacture according to a preferred version of the invention of a non-metallic magnetic material having in its final form the general formula $BaO.6Fe_2O_3$ and having a hexagonal crystal lattice structure.

The description refers to the accompanying drawing, which shows in FIGURES 1 and 2 respectively longitudinal and transverse sectional views of an extrusion nozzle for use in this process.

Manufacture commences by the preparation of a mix consisting of approximately 18% barium carbonate and 80% ferric oxide, the balance being mainly controlled additions of silica and/or lead oxide which can be made either prior or subsequent to the calcining operation which is carried out at approximately 1300° C.

The fired mass is then milled to a powder having a particle size distribution in the range 0 to 10 microns, and is mixed with 3% of a cereal flour/methyl cellulose solution, to act as a binder, and water to bring the mixture to a suitable plasticity for extrusion.

The plastic mass so produced is then extruded to provide a body of any desired cross-section. During extrusion the material is subjected to a magnetic field produced by polepieces and coils in the vicinity of or built into the extrusion nozzle. According to the properties desired of the final magnetic material, the orientating magnetic field may be either transverse or longitudinal, produced by means of coils respectively normal to or surrounding the axis of extrusion, or may be radial in direction especially in the case of segmented field magnets for fractional horsepower electric motors. The radial orientation may be produced by a coil and pole system including a central polepiece within the extrusion nozzle. The field may be applied continuously, or pulsed, achieving an economy in the necessary power required. Orientation takes place to some degree in fields of any value but the field should preferably be in excess of 3,000 oersteds.

The nozzle arrangement for a transversely-orientated extrusion is shown in the drawing.

The nozzle, into which the plastic material is fed by a conventional extrusion press (not shown) in the direction shown by the arrow 10, is of uniform rectangular cross-section defining the desired form of the extruded material. In its passage through the nozzle the plastic material passes first through an orientating zone 11 and subsequently through a demagnetizing zone 12. Each zone is defined by pairs of opposed pole-pieces 13 and 14 respectively. The pole-pieces 13 and 14 and each side of the nozzle are formed by the ends of the limbs of a common U-shaped magnetic circuit 15. This magnetic circuit component is made of low-reluctance magnetic material and is shown as a laminated component.

The magnetic circuit formed by the U-shaped yokes 15 and the magnetizing gaps 11 and 12 is energised by means of windings 16 on the limbs of the yokes forming the pole-pieces 13.

The sections of the nozzle 17 between and on either side of the magnetizing zones 11 and 12 are made of a non-magnetic material such as austenitic steel. The nozzle 17 may be a single tube having slots milled in its walls for the reception of the pole-pieces 13 and 14, or may be built up from sections suitably clamped together.

The windings 16 are energised, either continuously or in pulses, at a level sufficient to maintain in the orientating gap 11 a field of at least 3,000 oersteds and preferably of about 6,000 oersteds. The field required in the demagnetizing gap 12 is of a lower value, say 2,000 oersteds: with the common magnetic circuit shown this difference in the gap fields is achieved by making the cross-limbs 18 of the yokes 15 of relatively small cross-section and providing a further magnetic path of controlled reluctance (not shown) for the return flux in the main magnetic circuit.

It will be understood that separate magnetic circuits and energisation windings can be provided for the orientating and demagnetizing gaps 11 and 12, and also that if desired permanent magnets can be employed to provide the necessary fields.

Demagnetization of the extruded material before cutting to size and sintering reduces the picking up by the piece parts of the powder produced during cutting or grinding, and improves the packing factor during sintering, leading to improved dimensional control. Demagnetizing in the extrusion nozzle itself insures that the act of demagnetization cannot cause dimensional changes. The use of a continuous extrusion technique greatly facilitates the production of the piece parts The extrusions before or after drying are cut to the appropriate sizes and fired at a temperature between 1200 and 1300° C. The resultant piece parts can be ground to accurate size if necessary and subsequently magnetized.

Parts produced by this process show markedly anisotropic magnetic properties, the preferred direction of magnetization being determined by the direction of the orientating field. With this method orientation of 70% or more may be achieved, resulting in typical properties in the preferred direction of:

Brem = 2,800 gauss
Hc = 2,200 oersted
$BH_{max.} = 1.7 \times 10^6$ gauss oersted

We claim as our invention:

1. In a method of producing bodies of sintered non-metallic magnetic material, comprising mixing the material in granular form with a relatively small proportion of a binder to render the material plastic, extruding the mixed material to a desired cross-section, and thereafter firing the extruded material to remove substantially all the binder and to sinter together the particles of the magnetic material to form a rigid body, the improvement comprising subjecting the plastic material during extrusion to an artificial orientating magnetic field to impart anisotropic magnetic properties to the extruding material which are retained by the sintered material, and subjecting the extruded material to a demagnetizing field befor firing to sinter.

2. A method according to claim 1 wherein the extruding and two subjecting steps are carried out by extruding the plastic material through a nozzle having means for applying a magnetic field in the material at two spaced regions during its passage through the nozzle, the magnetic field at the first of said regions being said orientating field and the magnetic field at the second of said regions being said demagnetising field, the orientating and the demagnetising fields being oppositely directed.

3. A method according to claim 2, wherein the orientating and demagnetizing fields are provided by different portions of a common magnetic circuit.

4. The method of claim 1 wherein said non-metallic material is barium ferrite.

References Cited
UNITED STATES PATENTS

| | | | |
|---|---|---|---|
| 2,849,312 | 8/1958 | Peterman | 264—24 |
| 2,999,275 | 9/1961 | Blume | 264—108 |
| 3,274,303 | 9/1966 | Muller | 264—24 |

DONALD J. ARNOLD, *Primary Examiner.*